United States Patent [19]
Henry, Sr.

[11] 3,842,915
[45] Oct. 22, 1974

[54] BEAN HARVESTING MACHINE AND METHOD

[76] Inventor: Albert Henry, Sr., 1311 Faith Dr., Salina, Kans. 67401

[22] Filed: July 13, 1973

[21] Appl. No.: 378,928

[52] U.S. Cl. .................................. 171/1, 171/101
[51] Int. Cl. ............................................ A01d 29/00
[58] Field of Search ......... 171/84, 85, 86, 101, 104, 171/105, 62, 63, 64, 50; 56/229, 119, 314, 318

[56] References Cited
UNITED STATES PATENTS

| | | | |
|---|---|---|---|
| 1,386,141 | 8/1921 | Tausch | 171/101 |
| 2,030,587 | 2/1936 | Heaslet | 171/101 |
| 2,651,157 | 9/1953 | Drake | 171/101 |
| 2,722,794 | 11/1955 | McGee | 171/101 |
| 2,827,969 | 3/1958 | McPherson | 171/105 |

Primary Examiner—Antonio G. Guida
Attorney, Agent, or Firm—Schmidt, Johnson, Hovey & Williams

[57] ABSTRACT

A bean harvester has a series of leading, laterally spaced-apart, subsurface shovels that gently uproot the bean plants into a ground space between the shovels and the trailing pickup of the harvester. The ground space between the shovels and the pickup is such as to allow the plants to be completely freed from the soil by the shovels before the plants are contacted by the pickup, thereby avoiding shattering of the bean pods otherwise caused by sharp impact from the pickup. Strategically located ground-engaging support wheels in leading relationship to the pickup and adjacent the shovels gauge the depth of the latter.

16 Claims, 5 Drawing Figures

PATENTED OCT 22 1974　　　　　　　　　　　　　　　　3,842,915
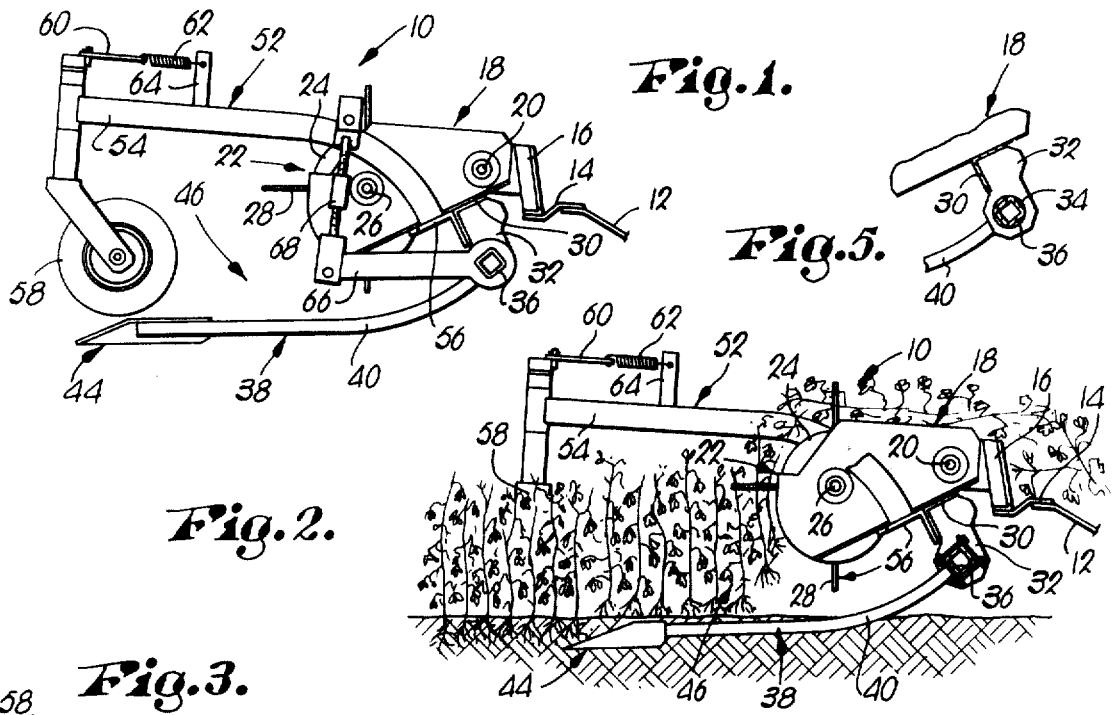
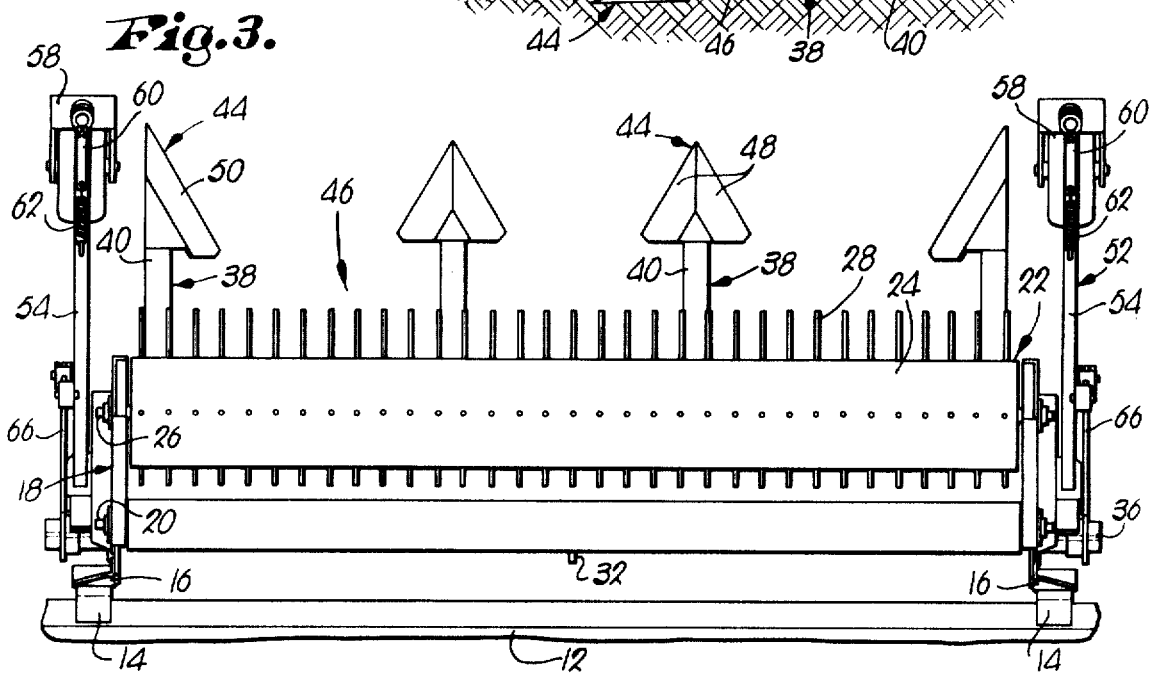
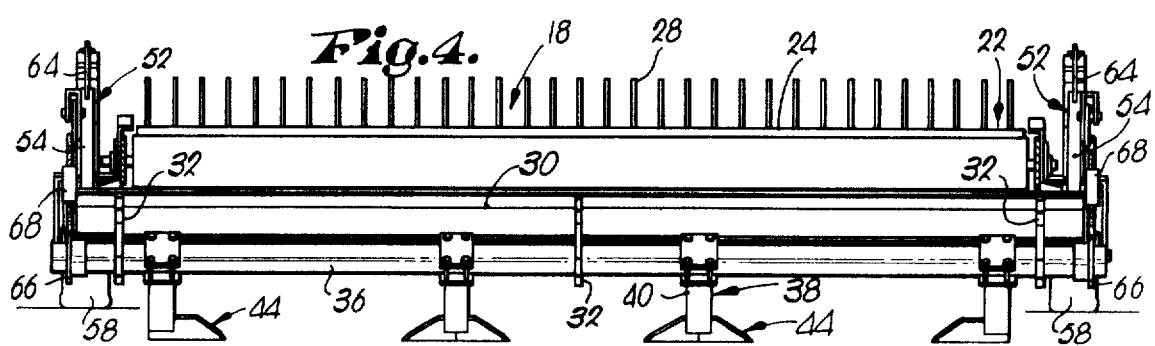

BEAN HARVESTING MACHINE AND METHOD

This invention relates to a harvester for crops such as soybeans, lima beans, navy beans, and similar plants, and provides an alternative to the common practice of sickling the plants during the initial stages of their harvest. Soybeans in particular are especially difficult to harvest because their bean pods shatter easily, their vines are very tough and spread in many diffuse directions rather than remain neatly in a row, and because many of the choicest beans are located close to or directly upon the surface of the ground itself. Thus, using conventional harvesting techniques where a combine with a reel and sickle is employed, the bean pods are often shattered by the impacting bat reel and reciprocating sickle so that the fruit merely spills onto the ground rather than being swept into the combine. Moreover, the sickle often passes over those parts of the bean plants that droop into adjacent furrows beside the rows so that a valuable portion of the crop is lost in this manner. Additionally, where the terrain is uneven, it is most difficult for the sickle to sever all plants at substantially the same level, missing many of the choicest, ground-hugging beans.

Many efforts have been made to improve the techniques of soybean harvesting, but these have met with only limited success because they necessitated the use of a sickle to separate the plants from the ground, thus subjecting the techniques to the inherent shortcomings above mentioned.

Accordingly, an important object of the present invention is to provide a harvesting method and apparatus, particularly useful for soybean harvesting, which eliminate all impact with the plants above the ground before actual pickup, such as heretofore experienced with reciprocating sickles and rotating bat reels, whereby to minimize shattering of the bean pods.

Pursuant to the foregoing, it is another important object to dislodge the growing plants from the soil by subsurface shovels which gently uproot the plants as the harvester is advanced, leaving them loosely on the surface of the ground for removal by trailing pickup mechanism.

Another important object is to assure that the bean plants are completely freed from the soil by the time the pickup engages the plants to lift them from the ground, and such is accomplished by spacing the shovels sufficiently far in advance of the pickup that the shovels can complete their functions before the pickup takes over.

A further important object of the instant invention is to remove the entire bean plant from the soil, leaving no stubble or low-lying branches as in sickling techniques, so as to obtain all available fruit produced by the plant, even those lying directly on top of the ground or embedded slightly therewithin.

An additional important object of this invention is the provision of a harvester as aforesaid wherein undue digging-in or raising-up of the shovels thereof is prevented by providing an arrangement whereby rises and falls in the terrain traversed by the harvester are quickly detected and appropriate accommodations made in the shovel depth.

In the drawing:

FIG. 1 is a side elevational view of a harvester embodying the concepts of the present invention;

FIG. 2 is a view of the harvester during use, parts being shown partially in elevation and in cross-section for clarity;

FIG. 3 is a top plan view of the harvester;

FIG. 4 is a rear elevational view thereof; and

FIG. 5 is a fragmentary, vertical cross-sectional view through the rear of the harvester showing the manner in which the shovels thereof are supported for vertical swinging movement.

The harvester 10 is designed for use in lieu of the bat reel and sickle of a conventional combine, although its motive power may be supplied by a combine (exclusive of the sickle and reel) in order that the fruit and vines of the plants being harvested may be separated by the combine as a harvesting swath is taken across a field. In this respect, the numeral 12 denotes the cutter bar of a combine to which the harvester 10 may conveniently be attached. Two or more mounting brackets 14 located at opposite ends of harvester 10 are fastened to the cutter bar 12 by any suitable means not shown, and are fixed to generally upstanding pieces 16 that swingably support the pickup unit 18 of harvester 10. Pickup 18 has a rearmost, normally transversely extending shaft 20 that comprises part of the gathering or pickup mechanism 22 of unit 18 and also serves as the axis of swinging movement for unit 18 about pieces 16. Other parts of the mechanism 22 include an elongated drum 24 normally extending transversely to the path of travel of harvester 10, supported for rotation by a transverse shaft 26 and having a plurality of fingers or tines 28 projecting radially therefrom for lifting plants from the ground when drum 24 is rotated.

An elongated angle member 30 extends along the lower back portion of unit 18 for the full length thereof and has three longitudinally spaced-apart, downwardly projecting mounts 32. Mounts 32 are provided with circular holes 34 that rotatably receive a tubular box beam 36 extending along the full length of unit 18. Beam 36 has four shovels 38 fastened thereto in longitudinally spaced-apart relationship, each shovel having an arcuate, downwardly and then forwardly extending shank 40 secured at its rear end by a clamp assembly 42 to the beam 36 and a pointed head 44 at the forwardmost end thereof. The length of each shank 40 is such that the head 44 is disposed substantially forwardly of the drum 24 with its tines 28, presenting a plant delivery space 46 between heads 44 and tines 28. The heads 44 of the inner shovels 38 are in the nature of a pair of oppositely sloping, severing and soil-turning blades 48 which converge at their leading ends, while the heads 44 of the two outer shovels 38 are provided only with single, inwardly sloping blades 50.

The front of the pickup unit 18 is supported by a ground-engaging support assembly 52 comprising a pair of arcuate, fore-and-aft extending arms 54 secured at opposite ends of unit 18 to a pair of right-angle brackets 56 in abutting relationship to angle member 30, each arm 54 having a caster wheel 58 at the forwardmost end thereof. As shown best in FIGS. 1 and 3, the wheels 58 are located at substantially the same forward dispositions as the shovel heads 44, the latter being disposed in a line between wheels 58. A rearwardly extending lever 60 at the upper end of each wheel 58 has a coil spring 62 yieldably connecting the same to a post 64 on arm 54 to bias the wheels 58 toward their normal straight-line positions illustrated throughout the Figures.

The box beam is provided at the opposite ends thereof with a pair of cranks 66 which control rotation of beam 36 and hence vertical swinging of the shovels 38. Each crank 66 has a turnbuckle 68 at the forwardmost end thereof connecting the crank 66 with the arm 54 of the proximal wheel assembly 58. Adjustment of turnbuckle 68 thereby regulates the depth of shovels 38 in unison.

OPERATION

As earlier mentioned, the harvester 10 is well-suited for attachment to the cutter bar 12 of a combine so that the harvested plants may be threshed by the machinery of the combine after being gathered by machine 10. It will be understood, however, that the particular means of supplying motive power to harvester 10 is not critical to the principles of the present invention and, in fact, it is within the concepts of the present invention to provide other types of motive devices for advancing harvester 10, in which case the threshing operation would be carried out separately. In any event, as the harvester 10 is advanced, the wheels 58 support the unit 18 for vertical swinging about the axis of shaft 20 in order than unevenness in the terrain may be accommodated. When the harvester 10 is being moved to the field, the shovels 38 should be raised to a ground-clearing elevation and this is accomplished by turning the turnbuckles 28 in the appropriate direction to swing cranks 66 upwardly, hence raising all shovels 38 in unison.

When the field is reached, the shovels 38 may be lowered to their proper operating depths by twisting turnbuckles 68 in the opposite direction. Preferably, the heads 44 should be lowered to positions in which they move beneath the surface of the ground during operation, rather than protruding upwardly through the surface of the ground. The harvester 10 is positioned with the shovel heads 44 in alignment with the rows of plants to be harvested and, as harvester 10 is advanced, the heads 44 are forced to move along the rows beneath the plants, gently uprooting the latter and depositing the same into space 46 immediately ahead of the unit 18. The plants within space 46 are completely freed from the soil so that when approached by the tines 28 (rotating clockwise as shown in FIG. 2), the loose plants are gathered up by the tines 28 and moved upwardly and rearwardly across the top of unit 18 toward the combine behind unit 18.

It is important to note that the shovel heads 44 do not sever the plants at positions above the ground as would be the case if a reciprocating sickle were used. Instead, heads 44 merely dislodge the plants or uproot the same without any above-ground contact therewith. Where the roots are particularly stubborn, severance thereof is effected by the blades 48 and 50.

In those instances where the plants being harvested are soybeans, this is extremely important because no sharp impacting action whatsoever is applied to the fragile bean pods, hence maintaining the pods substantially intact without any spillage. The loose plants are thereby easily elevated and projected rearwardly by the rotating tines 28. It is to be noted in this respect that inasmuch as the plants are loosely disposed within space 46 prior to engagement thereof by tines 28, the impact thereto by tines 28 is minimal because the plants present little resistance to movement. In contrast, substantial shattering occurred in prior harvesting techniques where bat reels were used to deflect the standing plants rearwardly toward the reciprocating sickle before the plants were freed from the soil. The rooted plants offer substantial resistance to rearward movement, hence increasing the impact of the reel therewith.

Also of importance is the fact that the shovel heads 44 separate the entire plants from the ground for subsequent pickup, not just those portions above a level determined by the height of a sickle. Even the fruit growing directly on the ground or slightly below the surface thereof is thus loosened for pickup and further processing, hence further increasing the yield.

By locating the wheels 58 substantially forwardly of the pickup units 18, rises and falls in the terrain are detected at an early stage and the unit 18 is swung upwardly or downwardly about axis 20 by wheels 58 as necessary to accommodate the unevenness. By locating the shovel heads 44 substantially at the same forward disposition as wheels 58, any unevenness detected by wheels 58 is immediately transmitted to heads 44 and the vertical movement of the latter to account for such unevenness is substantially the same as that encountered by wheels 58. That is to say, inasmuch as the shanks 40 of shovels 38 are of substantially the same length as the arms 54 for wheels 58, heads 44 swing arcuately about axis 20 to the same extent that wheels 58 swing about axis 20 when rises and falls are encountered. Therefore, undue digging-in or raising up of heads 44 is avoided.

It is to be noted also that a substantial portion of the shanks 40 disposed immediately rearwardly of heads 44 pass below the surface of the ground during operation. Thus, the area between wheels 58, including space 46, is completely free of above-ground obstructions which could otherwise entangle with the uprooted plants and cause the pods thereof to shatter. The plants are simply gently uprooted and lie on the ground within space 46 until swept upwardly and rearwardly by the tines 28.

The sloping blades 48 and 50 of heads 44 tend to deflect the plants laterally as they are uprooted, and this further assures that the loose plants will not be engaged by the advancing shanks 40. The blades 50 on the outermost shovel heads 44 deflect the plants only inwardly, hence confining the same to the path of advancement of pickup unit 18.

The importance of the space 46 between heads 44 and pickup tines 28 must be fully recognized because without space 46, the plants could not be fully uprooted before the rotating tines 28 came into contact therewith. Without space 46, uprooting and pickup would occur, or attempt to occur, simultaneously, and this is highly undesirable. Unless the plants are completely freed from the soil, they will substantially resist pickup by the tines 28 and hence, either shatter their pods or completely prevent pickup. By allowing a sufficient distance between heads 44 and tines 28 to enable the plants to be completely uprooted and totally freed from the soil, the plants offer little resistance to the tines 28 and are picked up wholly intact and with ease.

Having thus described the invention, what is claimed as new and desired to be secured by Letters Patent is:

1. A harvester for row plants comprising:
 a pickup provided with plant-gathering mechanism and adapted for advancement across a field having plants to be harvested thereon; and a series of laterally spaced-apart shovels on said pickup for the plant rows traversed by the pickup, said shovels having digging heads spaced forwardly from said mechanism in leading relationship thereto to define a space between the mechanism and the heads, said heads being normally disposed lower than said mechanism for subsurface advancement beneath and along the plant rows aligned therewith for successively uprooting the plants into said space and onto the ground, and said ground supported plants being removed therefrom by said trailing mechanism.

2. A harvester as claimed in claim 1, wherein said shovels are mounted for depth adjustment relative to said mechanism.

3. A harvester as claimed in claim 1, wherein said shovels are mounted for vertical swinging relative to said mechanism, there being depth control means releasably holding the shovels in any one of a number of selected vertical positions.

4. A harvester as claimed in claim 3, wherein said pickup is provided with a ground-engaging support assembly, said control means adjustably coupling the shovels with said assembly.

5. A harvester as claimed in claim 1, wherein said shovels are spaced along a common beam normally extending transversely to the path of travel of the pickup, said beam being supported by said pickup for rotation of the beam about its longitudinal axis for depth adjustment of said shovels in unison.

6. A harvester as claimed in claim 5, wherein said beam is provided with a crank and said crank is provided with adjuster means for swinging said crank to raise and lower said shovels.

7. A harvester as claimed in claim 6, wherein said pickup is provided with a ground-engaging support assembly, said adjuster means interconnecting said crank and the assembly.

8. A harvester as claimed in claim 1, wherein said pickup is provided with means rendering the same vertically swingable about a normally rearmost, transversely extending axis, said pickup being further provided with a ground-engaging support assembly ahead of said axis for guiding the pickup over rises and falls in the terrain.

9. A harvester as claimed in claim 8, wherein said heads of the shovels and said assembly are spaced forwardly of said axis substantially the same distance.

10. A harvester as claimed in claim 1, wherein said support assembly includes a pair of fore-and-aft extending arms on opposite ends of the pickup and a ground-engaging wheel at the forward end of each of said arms respectively, said shovels being disposed between said arms.

11. A harvester as claimed in claim 1, wherein each head is provided with a supporting shank extending rearwardly therefrom and passing below said mechanism in vertically spaced relationship thereto.

12. A harvester as claimed in claim 11, wherein said shanks are spaced along a common, transversely extending beam rotatably supported by said pickup, there being an adjustable, cranked connection between at least one of said arms and said beam for rotating the latter to vary the depth of said heads.

13. A method of harvesting row plants of the type having fruit which is easily shattered, said method including the steps of:

advancing a plant pickup across a field having plants thereon to be harvested, said pickup having means for containing the fruit against escape after the plants have been picked up;

forcing a subsurface tool along a plant row beneath the latter and ahead of said pickup to successively uproot the plants of the row;

depositing the plants uprooted by the tool upon the surface of the ground within a ground space between the tool and the pickup and leaving the plants within said space on the ground until acted upon by the pickup; and removing the uprooted plants from the ground space with said pickup.

14. A harvesting method as claimed in claim 13, wherein uprooting of the plants and depositing of the same ahead of the pickup are carried out without engaging the plants above ground.

15. A harvesting method as claimed in claim 14, wherein is included the step of avoiding contact with the uprooted plants between said receiving and removing steps.

16. A harvesting method as claimed in claim 13, wherein is included the step of guiding the pickup over rises and falls in the terrain by ground-engaging means spaced forwardly of the pickup, said uprooting being carried out at substantially the same forward disposition as said guiding.

* * * * *